(12) United States Patent
Kamihara et al.

(10) Patent No.: US 11,267,549 B2
(45) Date of Patent: Mar. 8, 2022

(54) METHOD FOR MANUFACTURING RESIN SHEET, RESIN SHEET, METHOD FOR MANUFACTURING STRUCTURAL BODY, STRUCTURAL BODY, AND AIRFRAME OF AIRCRAFT

(71) Applicant: MITSUBISHI HEAVY INDUSTRIES, LTD., Tokyo (JP)

(72) Inventors: Nobuyuki Kamihara, Tokyo (JP); Toshio Abe, Tokyo (JP); Naomoto Ishikawa, Tokyo (JP); Toshiyuki Takayanagi, Tokyo (JP); Mikio Muraoka, Akita (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 266 days.

(21) Appl. No.: 16/494,041

(22) PCT Filed: Mar. 16, 2018

(86) PCT No.: PCT/JP2018/010538
§ 371 (c)(1),
(2) Date: Sep. 13, 2019

(87) PCT Pub. No.: WO2018/169066
PCT Pub. Date: Sep. 20, 2018

(65) Prior Publication Data
US 2020/0023932 A1 Jan. 23, 2020

(30) Foreign Application Priority Data
Mar. 17, 2017 (JP) .............................. JP2017-052809

(51) Int. Cl.
| | | |
|---|---|---|
| *B64C 1/00* | (2006.01) | |
| *B29C 43/00* | (2006.01) | |
| *B29C 70/00* | (2006.01) | |
| *B32B 5/00* | (2006.01) | |
| *B32B 15/00* | (2006.01) | |
| *B64D 15/00* | (2006.01) | |
| *B64C 1/06* | (2006.01) | |
| *B29C 43/02* | (2006.01) | |
| *B29C 43/52* | (2006.01) | |
| *B29C 70/10* | (2006.01) | |
| *B32B 5/02* | (2006.01) | |
| *B32B 15/08* | (2006.01) | |
| *B64D 15/12* | (2006.01) | |

(52) U.S. Cl.
CPC .............. *B64C 1/061* (2013.01); *B29C 43/02* (2013.01); *B29C 43/52* (2013.01); *B29C 70/10* (2013.01); *B32B 5/02* (2013.01); *B32B 15/08* (2013.01); *B64D 15/12* (2013.01); *B64C 2001/0081* (2013.01)

(58) Field of Classification Search
CPC .. B64C 1/00; B64C 1/06; B64C 1/061; B29C 43/00; B29C 43/02; B29C 43/50; B29C 43/52; B29C 70/00; B29C 70/10; B32B 5/00; B32B 5/02; B32B 15/00; B32B 15/08; B64D 15/00; B64D 15/10; B64D 15/12

See application file for complete search history.

(56) References Cited

U.S. PATENT DOCUMENTS

| | | | | |
|---|---|---|---|---|
| 2009/0314765 | A1* | 12/2009 | Feng ..................... | H05B 3/145 219/520 |
| 2010/0136866 | A1 | 6/2010 | Kwag et al. | |
| 2011/0180524 | A1* | 7/2011 | Brittingham ............... | C08J 3/18 219/202 |
| 2015/0274911 | A1* | 10/2015 | Suzuki ..................... | B32B 7/06 428/414 |
| 2016/0082691 | A1 | 3/2016 | Restuccia et al. | |
| 2018/0079112 | A1 | 3/2018 | Kamihara et al. | |
| 2018/0126609 | A1 | 5/2018 | Kamihara et al. | |

FOREIGN PATENT DOCUMENTS

| | | |
|---|---|---|
| CN | 106313811 | 1/2017 |
| EP | 3 263 633 | 1/2018 |
| JP | 2008-156510 | 7/2008 |
| JP | 2013-91728 | 5/2013 |
| JP | 2016-94608 | 5/2016 |

(Continued)

OTHER PUBLICATIONS

Extended European Search Report dated Feb. 12, 2020 in corresponding European Patent Application No. 18766890.0.

(Continued)

*Primary Examiner* — Jacob T Minskey
*Assistant Examiner* — Matthew Hoover
(74) *Attorney, Agent, or Firm* — Wenderoth, Lind & Ponack, L.L.P.

(57) ABSTRACT

A method for manufacturing a resin sheet includes a coating step; a heating step; and a pressurizing step. In the coating step, linear metal nanomaterial is coated on a surface of a resin film having thermal plasticity. In the heating step, the resin film having the linear metal nanomaterial coated on the surface thereof is heated and softened. In the pressurizing step, the resin film having the linear metal nanomaterial coated on the surface thereof is pressurized to press the linear metal nanomaterial along a direction orthogonal to the surface on which the linear metal nanomaterial is coated. Thus, the coated linear metal nanomaterial penetrates the resin film to obtain the resin sheet containing the linear metal nanomaterial.

5 Claims, 12 Drawing Sheets

(56) References Cited

FOREIGN PATENT DOCUMENTS

| JP | 2016-221930 | 12/2016 |
| JP | 2016-222873 | 12/2016 |
| WO | 2016/048885 | 3/2016 |
| WO | 2016/194671 | 12/2016 |

OTHER PUBLICATIONS

International Search Report dated May 15, 2018 in International (PCT) Patent Application No. PCT/JP2018/010538.
Written Opinion of the International Searching Authority dated May 15, 2018 in International (PCT) Patent Application No. PCT/JP2018/010538, with English Translation.

\* cited by examiner

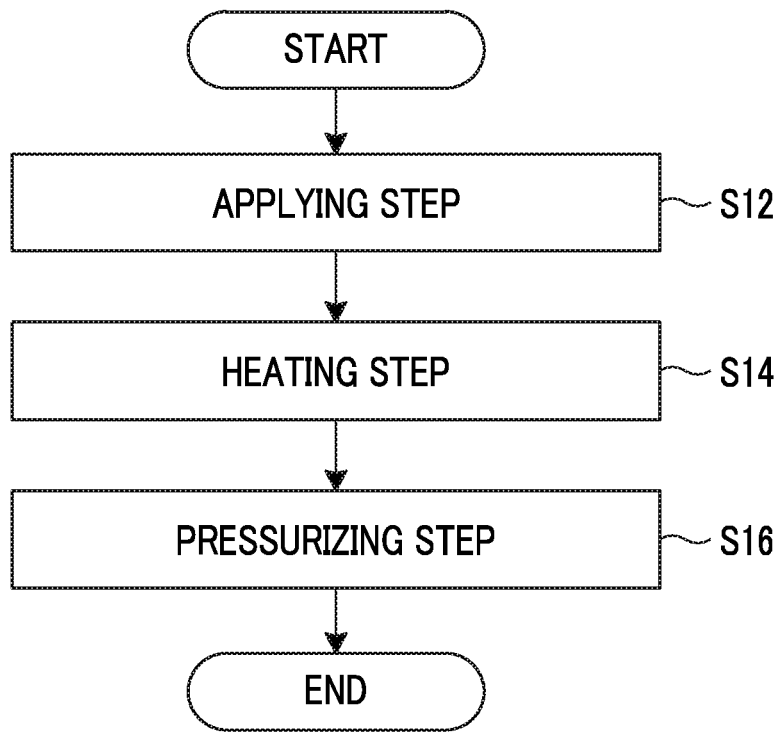
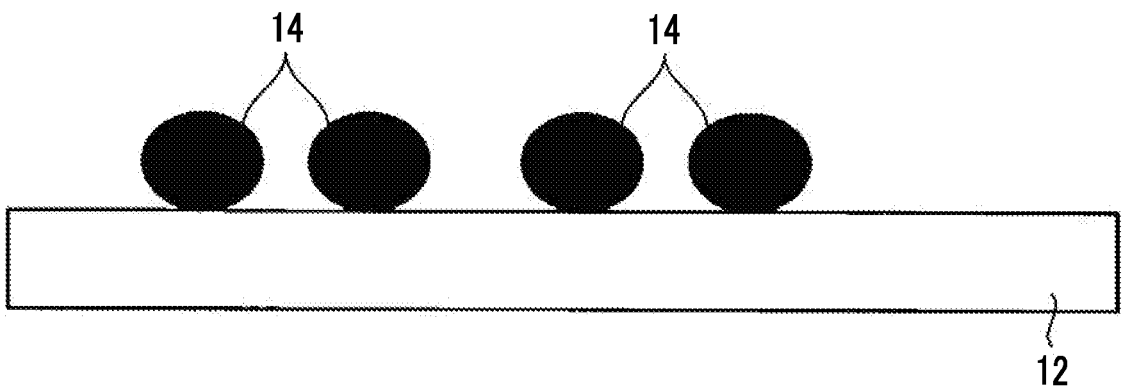

METHOD FOR MANUFACTURING RESIN SHEET, RESIN SHEET, METHOD FOR MANUFACTURING STRUCTURAL BODY, STRUCTURAL BODY, AND AIRFRAME OF AIRCRAFT

TECHNICAL FIELD

The present invention relates to a method for manufacturing a resin sheet, a resin sheet, a method for manufacturing a structure, a structure, and an airframe of an aircraft.

BACKGROUND ART

As a material having light weight and high strength, a composite material in which a resin is impregnated with reinforcing fibers is known. Composite materials are molded or attached under various temperature and pressure conditions, and are used in aircraft, vehicles, ships, and the like. As a method for heating a composite material, a heating method using a heater is known, and a heating method using a substance that absorbs microwaves has been examined. As the heating method using a substance that absorbs microwaves, a method of heating an adhesive containing a resin is known (see Patent Document 1).

CITATION LIST

Patent Literature

[PTL 1] Japanese Unexamined Patent Application Publication No. 2008-156510

SUMMARY OF INVENTION

Technical Problem

Similar to the method described in PTL 1, a method of heating a composite material using a substance that absorbs microwaves has been examined. The substance that absorbs microwaves is exemplified by a linear metal nanomaterial. The examined heating method in the related art will be described with reference to FIGS. 19 and 20. FIG. 19 is a schematic plan view of a resin sheet 100 in the related art. FIG. 20 is a schematic cross-sectional view of the resin sheet 100 in the related art. The resin sheet 100 in the related art is used in the examined heating method in the related art. As illustrated in FIGS. 19 and 20, the resin sheet 100 in the related art includes a resin film 102 in the related art and a linear metal nanomaterial 104 in the related art. The linear metal nanomaterial 104 in the related art is provided on one surface of the resin film 102 in the related art. In this heating method in the related art, the resin sheet 100 in the related art is brought into contact with one surface of the composite material to be heated, and the linear metal nanomaterial 104 in the related art included in the resin sheet 100 in the related art is irradiated with microwaves to generate heat, whereby the composite material is heated.

The resin film 102 in the related art and the linear metal nanomaterial 104 in the related art are substantially in point contact with each other, so that the contact area therebetween is small. Therefore, there is a possibility that the heat generated by the linear metal nanomaterial 104 in the related art may not be sufficiently transferred to the resin film 102 in the related art. Accordingly, there is a possibility that heat may not be uniformly transferred to the entire resin sheet 100 in the related art. As a result, there is a possibility that heat may not be sufficiently transferred to the composite material in contact with the resin sheet 100 in the related art, and the composite material may not be sufficiently heated.

The present invention has been made in view of the above description, and an object thereof is to provide a method for manufacturing a resin sheet capable of sufficiently transferring heat, a resin sheet, a method for manufacturing a structure using the resin sheet, a structure, and an airframe of an aircraft.

Solution to Problem

In order to solve the problems described above and achieve the object, a method for manufacturing a resin sheet, including: an applying step of applying a linear metal nanomaterial to a surface of a resin film having thermoplasticity; a heating step of heating and softening the resin film to which the linear metal nanomaterial is applied; and a pressurizing step of pressurizing the resin film to which the linear metal nanomaterial is applied, along a direction orthogonal to the surface to which the linear metal nanomaterial is applied, in which the applied linear metal nanomaterial is embedded in the resin film to form a resin sheet containing the linear metal nanomaterial.

According to this configuration, since the linear metal nanomaterial is embedded in the resin film, the contact area between the linear metal nanomaterial and the resin film is large. Therefore, the resin sheet capable of sufficiently transferring heat to a material provided in contact can be manufactured.

In this configuration, it is preferable that the linear metal nanomaterial is a nanofiber coated with a metal thin film. Alternatively, it is preferable that the linear metal nanomaterial is a nanocoil in which a metal thin film is formed in a coil shape. According to these configurations, the linear metal nanomaterial can suitably absorb microwaves and convert the microwaves into heat, so that the resin sheet capable of effectively heating the material provided in contact with the resin sheet can be manufactured.

In these configurations, it is preferable that the linear metal nanomaterial is formed in a network shape, and in the applying step, the linear metal nanomaterial formed in a network shape is transferred to the surface of the resin film. According to this configuration, since the linear metal nanomaterial can be uniformly distributed throughout, the resin sheet capable of uniformly heating the material provided in contact throughout can be manufactured.

In these configurations, it is preferable that in the heating step, the resin film is heated to a temperature that is 95% or more of a melting point of the resin film. According to this configuration, since the resin film can be sufficiently softened, the linear metal nanomaterial can be more reliably embedded in the resin film.

In these configurations, it is preferable that in the pressurizing step, the resin film is pressurized at 2000 Pa or more. According to this configuration, since the linear metal nanomaterial can be sufficiently pressed against the resin film, the linear metal nanomaterial can be more reliably embedded in the resin film.

In these configurations, it is preferable that the heating step is performed in a state in which the resin film is pressurized, or the pressurizing step is performed in a state in which the resin film is heated. According to this configuration, since the linear metal nanomaterial can be pressed while the resin film is in a softened state, the linear metal nanomaterial can be more reliably embedded in the resin film.

Furthermore, in the configuration in which the heating step is performed in a state in which the resin film is pressurized, or the pressurizing step is performed in a state in which the resin film is heated, the heating step is performed for 10 minutes or longer in a state in which the resin film is pressurized, or the pressurizing step is performed for 10 minutes or longer in a state in which the resin film is heated. According to this configuration, since the linear metal nanomaterial can be pressed state for a sufficient time while the resin film is in a softened state, the linear metal nanomaterial can be more reliably embedded in the resin film.

In these configurations, it is preferable that the resin film includes a reinforcing fiber that reinforces the resin film, a resin layer without the reinforcing fiber, and a composite layer containing the reinforcing fiber, and the applied linear metal nanomaterial is embedded in the resin layer. According to this configuration, since the resin film containing the composite layer can be used, the resin sheet with improved strength and stability can be manufactured.

In order to solve the problems described above and achieve the object, a resin sheet includes: a resin film having thermoplasticity; and a linear metal nanomaterial disposed to be embedded in the resin film.

According to this configuration, since the linear metal nanomaterial is embedded in the resin film, the contact area between the linear metal nanomaterial and the resin film is large, so that heat can be sufficiently transferred to the material provided in contact.

In this configuration, it is preferable that the linear metal nanomaterial is a nanofiber coated with a metal thin film. Alternatively, it is preferable that the linear metal nanomaterial is a nanocoil in which a metal thin film is formed in a coil shape. According to these configurations, the linear metal nanomaterial can suitably absorb microwaves and convert the microwaves into heat, so that the material provided in contact can be effectively heated.

In these configurations, it is preferable that the linear metal nanomaterial is formed in a network shape. According to this configuration, since the linear metal nanomaterial is uniformly distributed throughout, the material provided in contact can be uniformly heated throughout.

In these configurations, it is preferable that the resin film includes a reinforcing fiber that reinforces the resin film, a resin layer without the reinforcing fiber, and a composite layer containing the reinforcing fiber, and the linear metal nanomaterial is embedded in the resin layer. According to this configuration, since the resin film including the composite layer containing the reinforcing fiber is used, the strength and the stability are improved.

In order to solve the problems described above and achieve the object, a method for manufacturing a structure including a composite material, includes: a sheet disposing step of disposing the resin sheet according to any one of the above on a surface of the composite material; and a simultaneous curing step of applying an electric field to the resin sheet to cause the linear metal nanomaterial to generate heat and simultaneously curing the composite material and the resin sheet.

According to this configuration, since the resin sheet in which the linear metal nanomaterial is embedded in the resin film is used, the contact area between the linear metal nanomaterial and the resin is large. Therefore, heat can be sufficiently transferred and the composite material and the resin sheet can be simultaneously cured.

In this configuration, it is preferable that the linear metal nanomaterial absorbs an electromagnetic wave. According to this configuration, a stealth function for electromagnetic wave detection can be stably added by the linear metal nanomaterial protected by the resin.

In these configurations, it is preferable that the linear metal nanomaterial melts ice adhered to a surface of the structure by generating heat when an electric field is applied. According to this configuration, a surface ice melting function of melting ice adhered to the surface can be stably added by the linear metal nanomaterial protected by the resin.

In order to solve the problems described above and achieve the object, a structure containing a composite material, includes: a surface layer that is disposed on a surface of the structure and contains a resin; a linear metal nanomaterial layer that is disposed on one side of the surface layer and contains a resin and a linear metal nanomaterial disposed to be embedded in the resin; and a composite layer that is disposed on a side of the linear metal nanomaterial layer opposite to the surface layer and contains a resin and a reinforcing fiber reinforcing the resin.

According to this configuration, since the linear metal nanomaterial layer in which the linear metal nanomaterial is embedded in the resin is included, various functions based on the function of absorbing an electromagnetic wave can be provided.

In this configuration, it is preferable that the linear metal nanomaterial is a nanofiber coated with a metal thin film. Alternatively, it is preferable that the linear metal nanomaterial is a nanocoil in which a metal thin film is formed in a coil shape. According to these configurations, the linear metal nanomaterial can suitably absorb an electromagnetic wave.

In these configurations, it is preferable that the linear metal nanomaterial is formed in a network shape. According to this configuration, since the linear metal nanomaterial is uniformly distributed throughout, various functions based on the function of absorbing an electromagnetic wave uniformly throughout can be provided.

In these configurations, it is preferable that the linear metal nanomaterial absorbs an electromagnetic wave. According to this configuration, a stealth function for electromagnetic wave detection can be stably provided by the linear metal nanomaterial protected by the resin.

In these configurations, it is preferable that the linear metal nanomaterial melts ice adhered to a surface of the structure by generating heat when an electric field is applied. According to this configuration, a surface ice melting function of melting ice adhered to the surface can be stably provided by the linear metal nanomaterial protected by the resin.

In order to solve the problems described above and achieve the object, an airframe of an aircraft includes: a surface member using the structure according to any one of the above.

According to this configuration, various functions based on the function of absorbing an electromagnetic wave provided in the above-mentioned structure, such as a stealth function or a surface ice melting function can be provided.

Advantageous Effects of Invention

According to the present invention, a method for manufacturing a resin sheet capable of sufficiently transferring heat, a resin sheet, a method for manufacturing a structure using the resin sheet, a structure, and an airframe of an aircraft can be provided.

BRIEF DESCRIPTION OF DRAWINGS

FIG. 7 is a flowchart showing a method for manufacturing the resin sheet according to the first embodiment.

FIG. 8 is a schematic cross-sectional view illustrating one state in the method for manufacturing the resin sheet according to the first embodiment.

DESCRIPTION OF EMBODIMENTS

Hereinafter, embodiments according to the present invention will be described in detail with reference to the drawings. The present invention is not limited by the embodiments. In addition, constituent elements in the embodiments include those that can be easily replaced by the skilled in the art or those that are substantially the same. Furthermore, the constituent elements described below can be combined as appropriate.

First Embodiment

Figure 1:
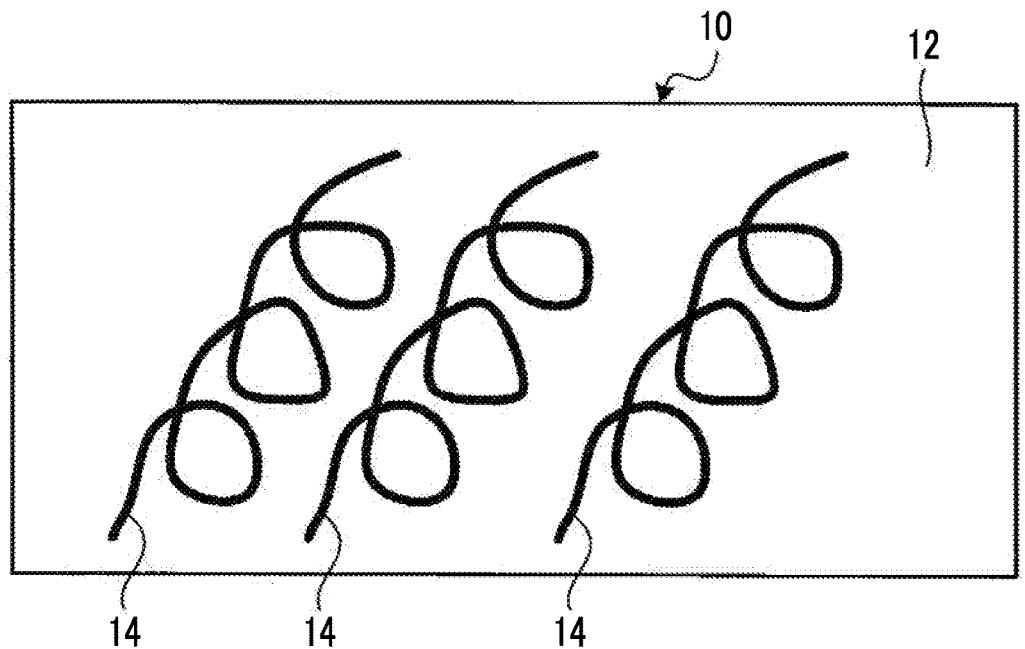
FIG. 1 is a schematic plan view of a resin sheet according to a first embodiment.
Figure 2:
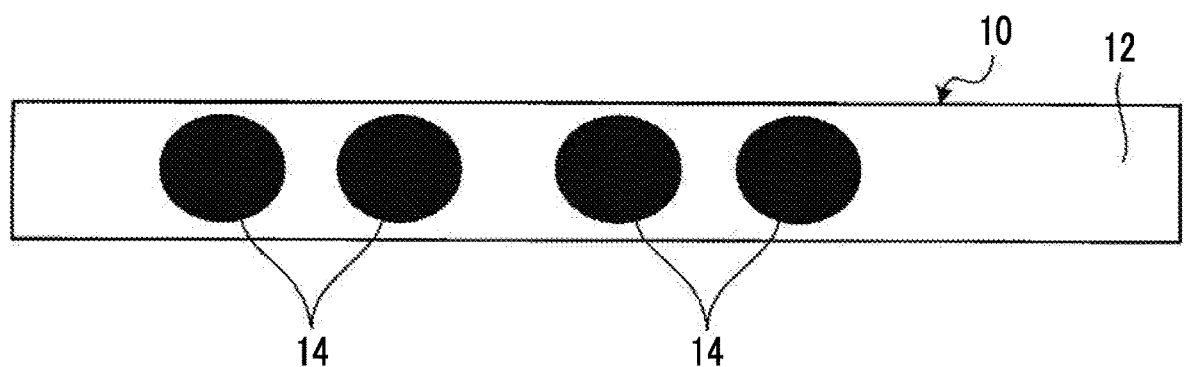
FIG. 2 is a schematic cross-sectional view of the resin sheet according to the first embodiment.

FIG. 1 is a schematic plan view of a resin sheet 10 according to a first embodiment. FIG. 2 is a schematic cross-sectional view of the resin sheet 10 according to the first embodiment. As illustrated in FIGS. 1 and 2, the resin sheet 10 includes a resin film 12 and a linear metal nanomaterial 14. The resin sheet 10 absorbs irradiated microwaves and generates heat, thereby heating a material provided in contact with at least one surface of the resin sheet 10, for example, a composite material. Here, the composite material is exemplified by a material used for aircraft, vehicles, ships, and the like.

The resin film 12 is a film formed of a thermoplastic resin having thermoplasticity. The shape and size of the film in the surface direction in the resin film 12 are not particularly limited. The thickness of the resin film 12 along the direction orthogonal to the surface direction of the film is preferably 0.1 mm or less. The thermoplastic resin forming the resin film 12 is exemplified by polyetheretherketone (PEEK), polyetherketoneketone (PEKK), and polyphenylene sulfide (PPS).

The linear metal nanomaterial 14 is disposed to be embedded in the resin film 12. That is, the linear metal nanomaterial 14 is covered with the resin film 12 over the entire surface of the linear metal nanomaterial 14, is fused to the resin film 12, and is protected by the resin film 12. The linear metal nanomaterial 14 is formed to extend linearly, that is, in a one-dimensional direction. The diameter of the linear metal nanomaterial 14 in a cross section orthogonal to the direction in which the linear metal nanomaterial 14 extends linearly is a size on the order of nm (about 1 to several hundred nm). The linear metal nanomaterial 14 is preferably formed in a network shape. Preferable examples of the linear metal nanomaterial 14 include nanofibers coated with a metal thin film and nanocoils in which a metal thin film is formed in a coil shape.

Figure 3:
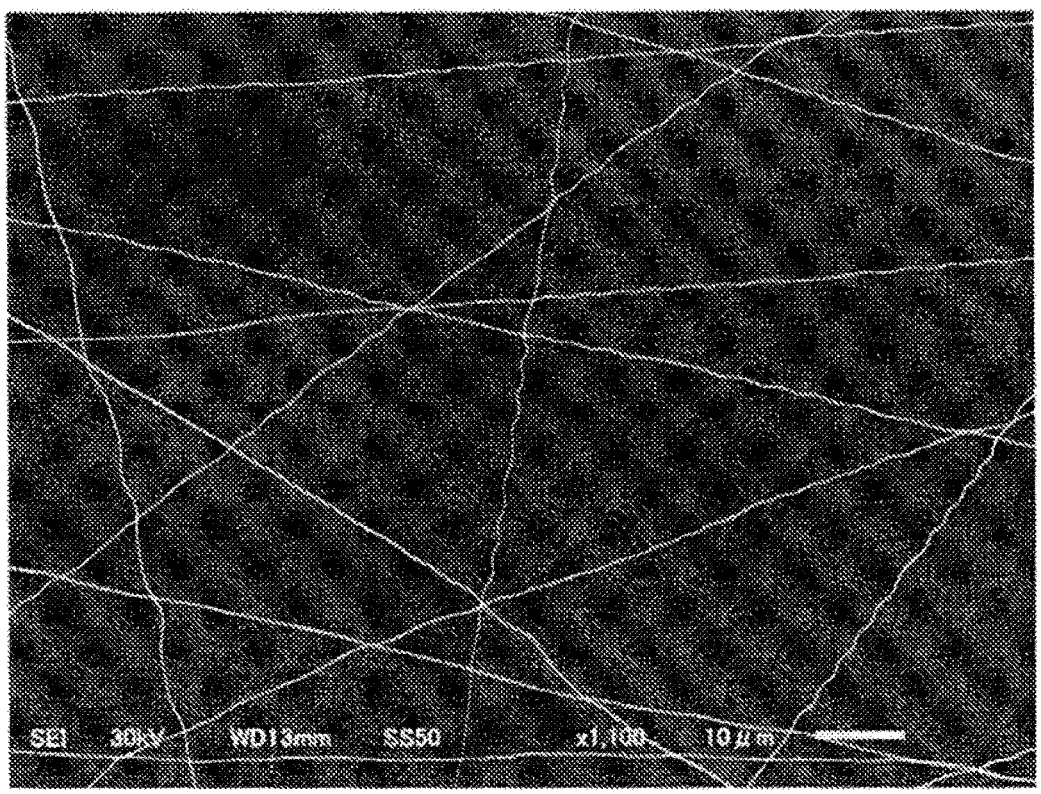
FIG. 3 is a view showing an example of a secondary electron image by a scanning electron microscope showing nanofibers as an example of a linear metal nanomaterial.
Figure 4:
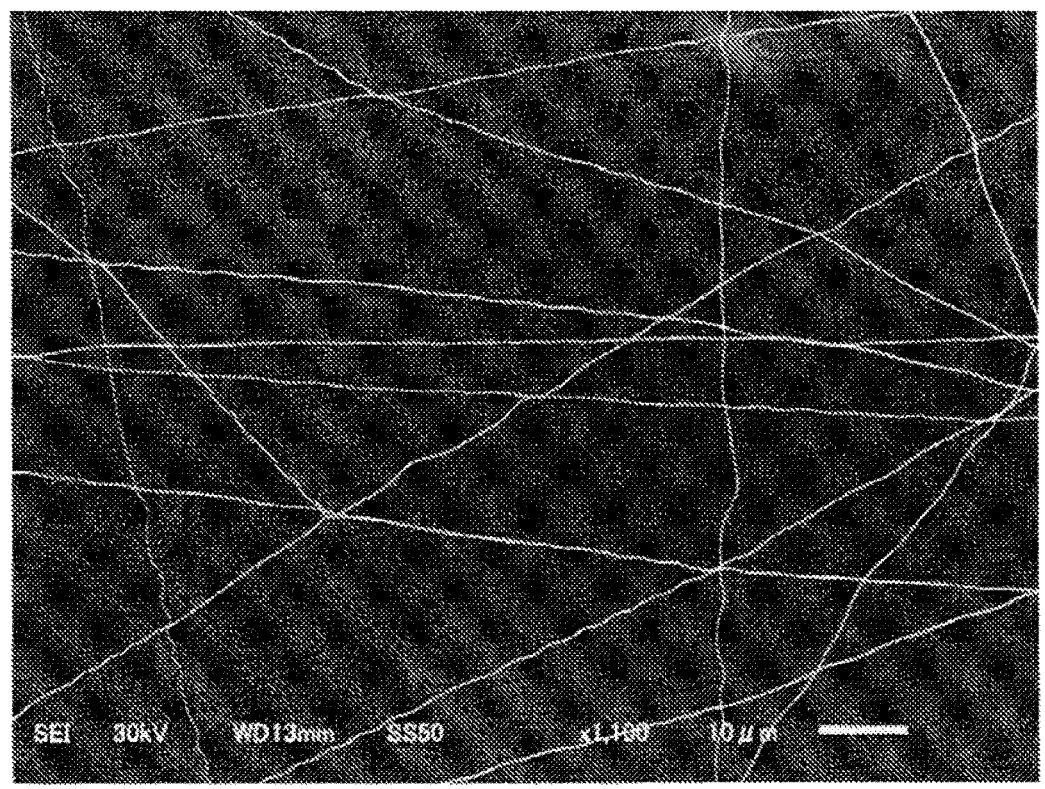
FIG. 4 is a view showing another example of a secondary electron image by the scanning electron microscope showing nanofibers as an example of the linear metal nanomaterial.
Figure 5:
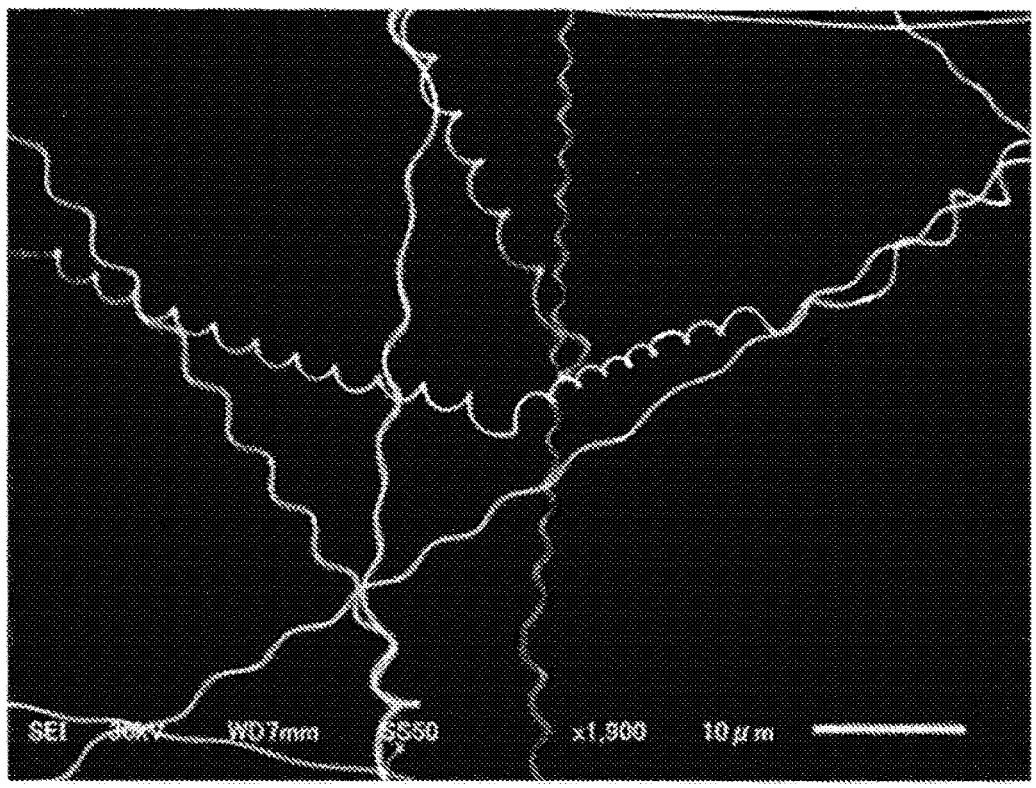
FIG. 5 is a view showing an example of a secondary electron image by the scanning electron microscope showing nanocoils as an example of the linear metal nanomaterial.
Figure 6:
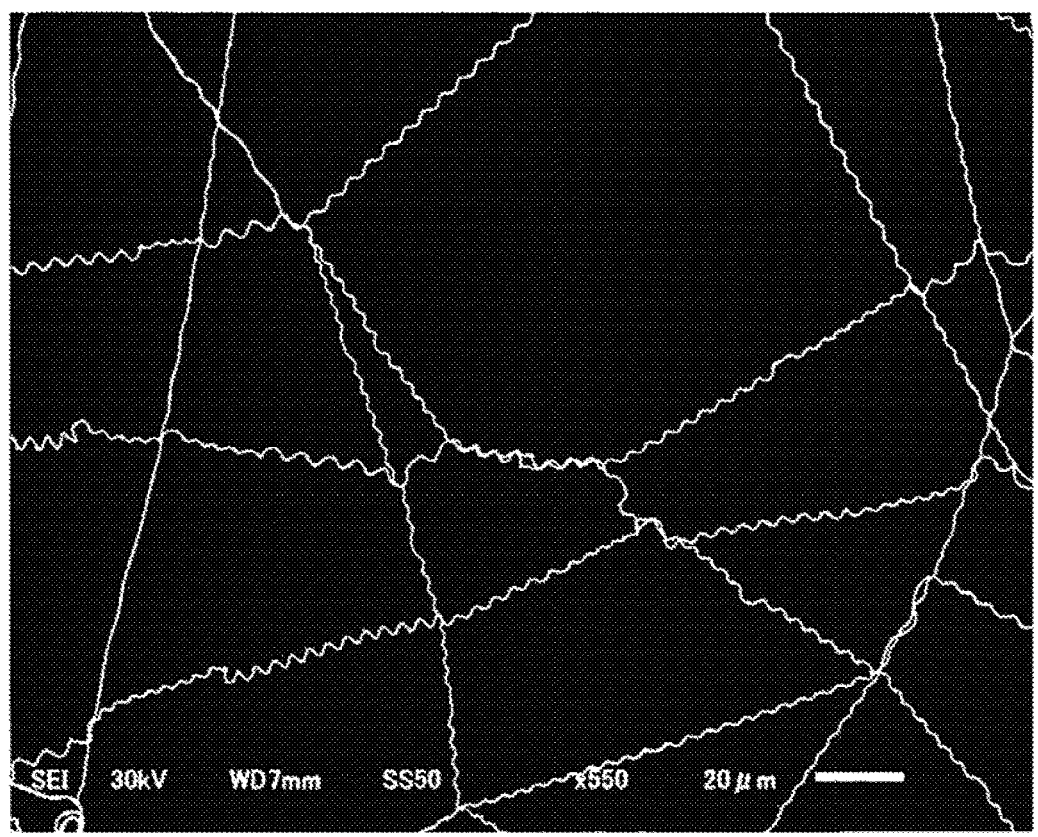
FIG. 6 is a view showing another example of a secondary electron image by the scanning electron microscope showing nanocoils as an example of the linear metal nanomaterial.

FIG. 3 is an example of a secondary electron image (SEI) by a scanning electron microscope (SEM) showing nanofibers as an example of the linear metal nanomaterial 14. FIG. 4 is another example of a secondary electron image by the scanning electron microscope showing nanofibers as an example of the linear metal nanomaterial 14. FIG. 5 is an example of a secondary electron image by the scanning electron microscope showing nanocoils as an example of the linear metal nanomaterial 14. FIG. 6 is another example of a secondary electron image by the scanning electron microscope showing nanocoils as an example of the linear metal nanomaterial 14. The details of the nanofibers and nanocoils exemplified for the linear metal nanomaterial 14 will be described using FIGS. 3 to 6.

The nanofibers are formed in a network shape as illustrated in FIGS. 3 and 4. Therefore, the nanofibers are uniformly distributed over the entire surface where the nanofibers are formed. The nanofiber includes a core portion and a metal thin film covering the core portion.

The core portion of the nanofiber is formed to extend linearly, that is, in a one-dimensional direction. The core portion of the nanofiber preferably has a diameter of 30 nm or more and 1000 nm or less in a cross section orthogonal to the linearly extending direction. The core portion of the nanofibers is formed of, for example, a polymer. The polymer forming the core portion of the nanofiber is exemplified by suitably using polyvinyl alcohol (PVA), polyethylene terephthalate (PET), polyurethane (PU), polyacrylonitrile (PAN), polylactic acid (PLA), polyphenylene vinylene (PPV), nylon 6, and the like.

The core portion of the nanofiber is formed by, for example, an electrospinning method, a melt blowing method, or a drawing method. In a case where the core portion of the nanofiber is formed by an electrospinning method, specifically, the core portion is formed in a network shape by spraying a polymer solution filling a syringe toward a substrate from a nozzle in a state in which a predetermined voltage is applied between the nozzle and the substrate, and volatilizing the solvent contained in the polymer solution. The polymer contained in the polymer solution is exemplified by the same polymer as the polymer forming the core portion of the nanofiber described above. The core portion of the nanofiber is not limited to the polymer, and may be formed of a material containing a metal or a metal.

The metal thin film of the nanofiber preferably has a film thickness in a range of 5 nm to 50 nm. For example, the metal thin film of the nanofiber is exemplified by suitably using a noble metal such as platinum (Pt) or gold (Au), or a metal such as copper (Cu) or nickel (Ni). The metal thin film of the nanofiber is formed by, for example, a sputtering method, a vapor deposition method, or a CVD method.

The nanocoils are formed in a network shape as illustrated in FIGS. 5 and 6. Therefore, the nanocoils are uniformly distributed over the entire surface where the nanocoils are formed. The nanocoil is a metal thin film linearly extended and formed in a coil shape. In the nanocoil, the maximum length of the cross section orthogonal to the linearly extending direction is preferably in a range of 40 nm to 1000 nm. In the nanocoil, the helix diameter of the coil shape is preferably in a range of 100 nm to 2000 nm. In the nanocoil, the pitch of the coil shape is preferably in a range of 100 nm to 10000 nm.

For example, the nanocoil is obtained by heating the above-mentioned nanofiber in which the core portion of the nanofiber is formed of the polymer, to a temperature equal to or higher than the boiling point or thermal decomposition temperature of the polymer forming the core portion of the nanofiber and equal to or lower than the melting point of the metal thin film of the nanofiber in a state in which the tension applied to the nanofiber is relaxed.

As the nanofiber is heated to the above-mentioned temperature, the polymer of the core portion of the nanofiber is vaporized or decomposed, and discharged from the gaps or the like of the metal thin film of the nanofiber to the outside. Accordingly, only the metal thin film of the nanofiber remains. The metal thin film of the nanofiber shrinks in a coil shape having a cross-sectional maximum length, a helix system, and a pitch within the above-mentioned ranges by being heated to the above-mentioned temperature. As described above, the nanocoils are obtained by heating the nanofibers to the above-mentioned temperature.

The nanofibers and the nanocoils exemplifying the linear metal nanomaterial 14 each have the above-described configurations and thus can absorb microwaves. In addition, these nanofibers and nanocoils can absorb electromagnetic waves, and can generate heat when an electric field is applied.

Since the resin sheet 10 has the configuration as described above, the linear metal nanomaterial 14 is embedded in the resin film 12, and thus the contact area between the linear metal nanomaterial 14 and the resin film 12 is large. Therefore, heat can be sufficiently transferred to the material provided in contact with the resin sheet 10.

Moreover, in the resin sheet 10, the linear metal nanomaterial 14 is preferably the nanofibers coated with the metal thin film or the nanocoils in which the metal thin film is formed in a coil shape. In this case, in the resin sheet 10, the linear metal nanomaterial 14 can suitably absorb microwaves, convert the microwaves into heat, and generate heat, so that the material provided in contact with the resin sheet 10 can be efficiently heated.

Moreover, in the resin sheet 10, the linear metal nanomaterial 14 is preferably formed in a network shape. In this case, since the linear metal nanomaterial 14 is uniformly distributed throughout the resin sheet 10, the material provided in contact with the resin sheet 10 can be uniformly heated throughout.

Figure 9:
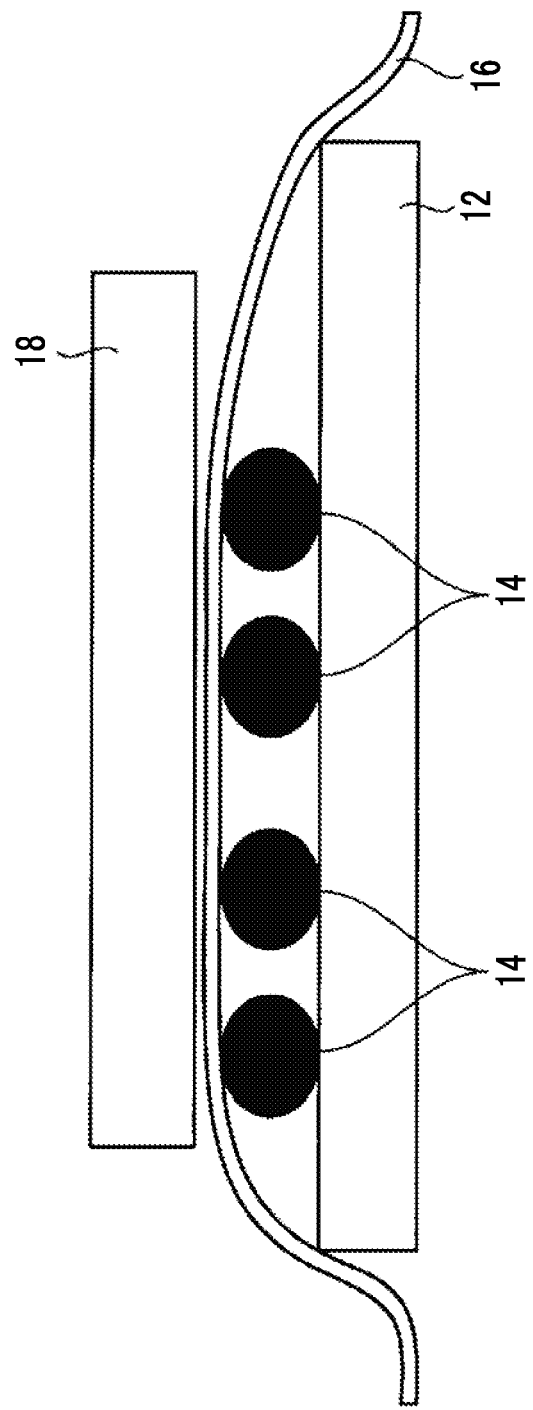
FIG. 9 is a schematic cross-sectional view illustrating another state in the method for manufacturing the resin sheet according to the first embodiment.
Figure 10:
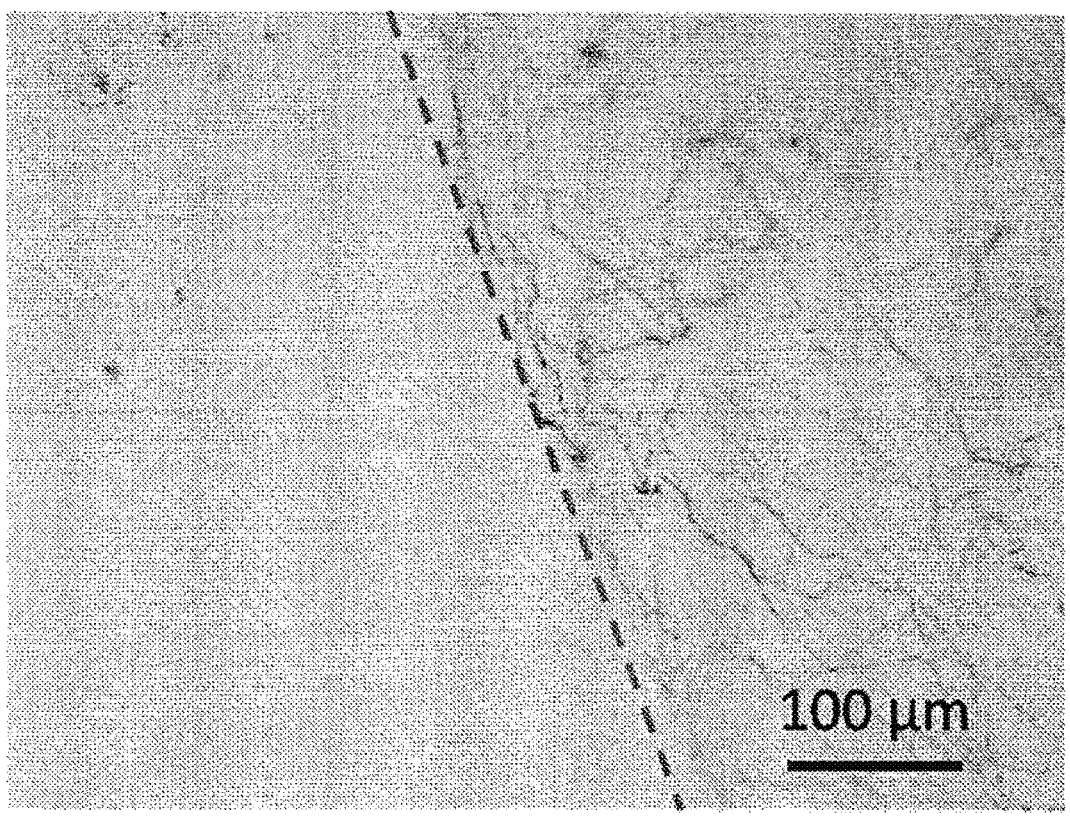
FIG. 10 is a view showing an example of an image by an optical microscope showing nanocoils embedded in a resin film.
Figure 11:
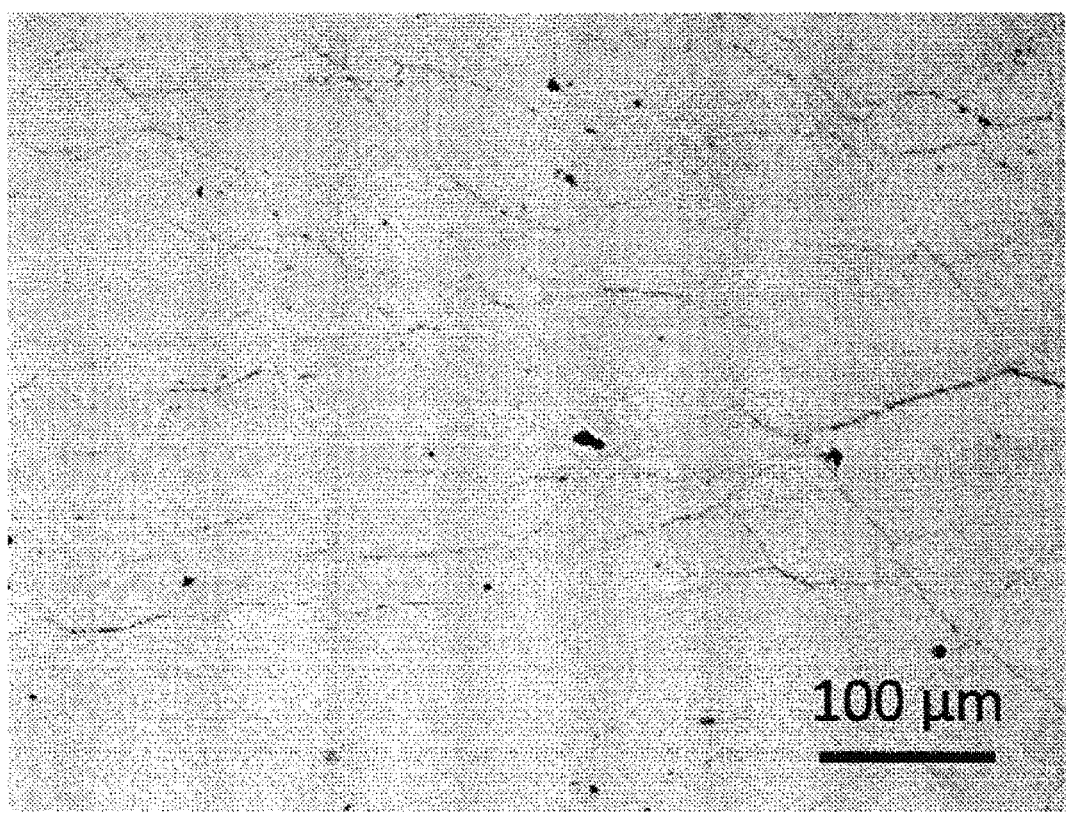
FIG. 11 is a view showing another example of an image by the optical microscope showing nanocoils embedded in the resin film.

FIG. 7 is a flowchart showing a method for manufacturing the resin sheet 10 according to the first embodiment. FIG. 8 is a schematic cross-sectional view illustrating one state in the method for manufacturing the resin sheet 10 according to the first embodiment. FIG. 9 is a schematic cross-sectional view illustrating another state in the method for manufacturing the resin sheet 10 according to the first embodiment. FIG. 10 is an example of an image by an optical microscope showing nanocoils embedded in the resin film 12. FIG. 11 is another example of an image by the optical microscope showing nanocoils embedded in the resin film 12. The method for manufacturing the resin sheet 10 according to the first embodiment will be described using FIGS. 7 to 11. As shown in FIG. 7, the method for manufacturing the resin sheet 10 includes an applying step (step S12), a heating step (step S14), and a pressurizing step (step S16).

First, the linear metal nanomaterial 14 is applied to the surface of the resin film 12 having thermoplasticity (step S12). In step S12, the resin film 12 is fixed by the van der Waals force of the surface of the linear metal nanomaterial 14. By step S12, as illustrated in FIG. 8, a state in which the linear metal nanomaterial 14 is applied to the surface of the resin film 12 is achieved.

As described above, the linear metal nanomaterial 14 is preferably formed in a network shape. In this case, in step S12, the linear metal nanomaterial 14 formed in a network shape is transferred to the surface of the resin film 12. Furthermore, as the linear metal nanomaterial 14, as described above, the nanofibers coated with the metal thin film or the nanocoils in which the metal thin film is formed in a coil shape can be adopted as a preferable example.

Next, after step S12, the resin film 12 having the linear metal nanomaterial 14 applied to the surface by step S12 is heated and softened (step S14). In step S14, by using an electric field for heating the linear metal nanomaterial 14 without heating the resin film 12, it is preferable to use a heating device for heating the resin film 12, such as a heater or infrared heating. Accordingly, the resin film 12 can be suitably heated and softened.

In step S14, it is preferable to heat the resin film 12 to a temperature that is 95% or more of the melting point of the resin film 12. In this case, since the resin film 12 can be sufficiently softened in step S14, the linear metal nanomaterial 14 can be more reliably embedded in the resin film 12 in the pressurizing step (step S16), which is subsequently performed.

In step S14, it is preferable to heat the resin film 12 to a temperature that falls within a range of 110% to 120% of the melting point of the resin film 12. In this case, since the resin film 12 can be softened more sufficiently in step S14, the linear metal nanomaterial 14 can be more reliably embedded in the resin film 12 in the pressurizing step (step S16), which is subsequently performed.

FIG. 10 shows the resin sheet 10 manufactured by heating the resin film 12 to a temperature that is 102% of the melting point of the resin film 12 by step S14 to cause the nanocoils as the linear metal nanomaterial 14 to be embedded in the resin film 12. In the resin sheet 10 shown in FIG. 10, the nanocoils as the linear metal nanomaterial 14 are sufficiently embedded in the resin film 12 as shown on the right side of the broken line in FIG. 10. On the other hand, when the resin sheet 10 shown in FIG. 10 is rubbed with the tip of the tweezers with sharp surfaces as shown on the left side of the broken line in FIG. 10, the nanocoils as the linear metal nanomaterial 14 are peeled off from the resin film 12. From this, it can be seen that when the resin film 12 is heated to a temperature that is 95% or more of the melting point of the resin film 12 in step S14, the nanocoils as the linear metal nanomaterial 14 can be sufficiently embedded in the resin film 12 to a level that can be sufficiently suitably used as the resin sheet 10.

FIG. 11 shows the resin sheet 10 manufactured by heating the resin film 12 to a temperature that is 116% of the melting point of the resin film 12 by step S14 to cause the nanocoils as the linear metal nanomaterial 14 to be embedded in the resin film 12. In the resin sheet 10 shown in FIG. 11, even if the nanocoils as the linear metal nanomaterial 14 are sufficiently embedded in the resin film 12 and the resin sheet 10 is rubbed with the tip of the tweezers with sharp surfaces, the nanocoils as the linear metal nanomaterial 14 are sufficiently embedded so as not to be peeled off from the resin film 12. From this, it can be seen that when the resin film 12 is heated to a temperature that falls within a range of 110% to 120% of the melting point of the resin film 12 in step S14, the nanocoils as the linear metal nanomaterial 14 can be sufficiently embedded in the resin film 12 to a level that can be sufficiently suitably used as the resin sheet 10. Furthermore, in this case, it can be seen that the nanocoils as the linear metal nanomaterial 14 can be sufficiently embedded so as not to be peeled off from the resin film 12 even in a case of being scratched by those with a sharp surface.

When the resin film 12 is heated to a temperature exceeding 120% of the melting point of the resin film 12 in step S14, there is a possibility that the shape of the resin film 12 may be largely collapsed or completely dissolved. From this, in step S14, it is preferable to heat the resin film 12 to a temperature which does not exceed 120% of the melting point of the resin film 12.

Next, after step S14, the resin film 12 which has the linear metal nanomaterial 14 applied to the surface in step S12 and is heated and softened in step S14 is pressurized so that the linear metal nanomaterial 14 is pressed along the direction orthogonal to the surface to which the linear metal nanomaterial 14 is applied (step S16). In step S16, as illustrated in FIG. 9, the upper side of the linear metal nanomaterial 14 applied to the upper surface of the resin film 12 is covered with a pressurizing sheet 16 for pressurizing the resin film 12, and the resin film 12 is pressurized so as to press the linear metal nanomaterial 14 in a state in which a weight 18 is placed on the pressurizing sheet 16. Step S16 is not limited thereto, the resin film 12 may be pressurized so as to press the linear metal nanomaterial 14 by a pressurizer instead of the weight 18.

Since the linear metal nanomaterial 14 is pressed against the softened resin film 12 in steps S14 and S16, the linear metal nanomaterial 14 is embedded inside the resin film 12 by the van der Waals force acting between the linear metal nanomaterial 14 and the resin film 12. Accordingly, the resin sheet 10 containing the linear metal nanomaterial 14 is obtained.

In step S16, the resin film 12 is preferably pressurized at 2000 Pa or more, and more preferably 2690 Pa or more so as to press the linear metal nanomaterial 14. In this case, since the linear metal nanomaterial 14 can be sufficiently pressed against the resin film 12 in step S16, the linear metal nanomaterial 14 can be more reliably embedded in the resin film 12.

In addition, the method for manufacturing the resin sheet 10 is not limited to performing step S14 and step S16 in this order. For example, in the method for manufacturing the resin sheet 10, step S14 may be performed after step S16 is performed, or step S14 and step S16 may be simultaneously performed. In the method for manufacturing the resin sheet 10, at least the time during which the resin film 12 is softened and the time during which the resin film 12 may overlap.

In the method for manufacturing the resin sheet 10, it is preferable that step S14 is performed in a state in which the resin film 12 is pressurized, or step S16 is performed in a state in which the resin film 12 is heated. In this case, in the method for manufacturing the resin sheet 10, since the linear metal nanomaterial 14 can be pressed while the resin film 12 is in a softened state, the linear metal nanomaterial 14 can be more reliably embedded in the resin film 12.

Furthermore, in the method for manufacturing the resin sheet 10, it is more preferable that step S14 is performed for 10 minutes or longer in a state in which the resin film 12 is pressurized, or step S16 is performed for 10 minutes or longer in a state in which the resin film 12 is heated. In this case, in the method for manufacturing the resin sheet 10, since the linear metal nanomaterial 14 can be pressed for a sufficient time while the resin film 12 is in a softened state, the linear metal nanomaterial 14 can be more reliably embedded in the resin film 12.

Since the method for manufacturing the resin sheet 10 has the configuration as described above, the linear metal nanomaterial 14 is embedded in the resin film 12, and thus the contact area between the linear metal nanomaterial 14 and the resin film 12 is large. Therefore, the resin sheet 10 capable of sufficiently transferring heat to the material provided in contact can be manufactured.

In the method for manufacturing the resin sheet 10, it is preferable that the linear metal nanomaterial 14 used for the resin sheet 10 is the nanofibers coated with the metal thin film or the nanocoils in which the metal thin film is formed in a coil shape. In this case, in the method for manufacturing the resin sheet 10, the linear metal nanomaterial 14 can suitably absorb microwaves, convert the microwaves into heat, and generate heat, so that the resin sheet 10 capable of effectively heating the material provided in contact with the resin sheet 10 can be manufactured.

In the method for manufacturing the resin sheet 10, it is preferable that the linear metal nanomaterial 14 used for the resin sheet 10 is formed in a network shape. In this case, in the method for manufacturing the resin sheet 10, since the linear metal nanomaterial 14 is uniformly distributed throughout, the resin sheet 10 capable of uniformly heating the material provided in contact throughout can be manufactured.

Second Embodiment

Figure 12:
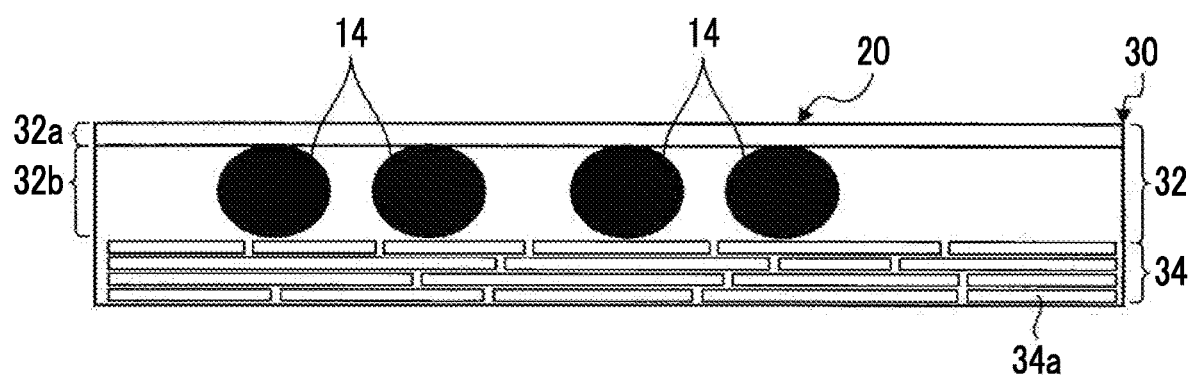
FIG. 12 is a schematic cross-sectional view of a resin sheet according to a second embodiment.

FIG. 12 is a schematic cross-sectional view of a resin sheet 20 according to a second embodiment. In addition, in FIG. 12, reinforcing fibers 34a are drawn in an extreme form for the description of the embodiment. However, in practice, the reinforcing fibers 34a are thinner than the illustrated size and are finely intertwined. The resin sheet 20 is obtained by changing the resin film 12 in the resin sheet 10 to a resin film 30. In the description of the second embodiment, like configurations similar to those of the first embodiment are denoted by like reference numeral groups similar to those of the first embodiment, and the detailed description thereof will not be repeated.

As shown in FIG. 12, the resin sheet 20 includes the resin film 30 and the linear metal nanomaterial 14. Similar to the resin sheet 10, the resin sheet 20 absorbs irradiated microwaves and generates heat, thereby heating a material provided in contact with at least one surface of the resin sheet 20, for example, a composite material.

The resin film 30 is a film formed of the same material as the resin film 12. The resin film 30 further includes the reinforcing fibers 34a that reinforce the resin film 30 and are impregnated in the resin film 30. The resin film 30 includes a resin layer 32 without the reinforcing fibers 34a and a composite layer 34 including the reinforcing fibers 34a. In a case where the resin layer 32 and the composite layer 34 have a common resin, the resin of the resin layer 32 and the composite layer 34 is integrated, so that there is no clear boundary.

The reinforcing fibers 34a are exemplified by a bundle of several hundreds to several thousands of basic fibers in a range of 5 μm to 7 μm. The basic fibers constituting the reinforcing fibers 34a are exemplified by carbon fibers. The basic fibers constituting the reinforcing fibers 34a are not limited thereto, and may be other plastic fibers, glass fibers, or metal fibers.

The linear metal nanomaterial 14 is disposed to be embedded in the resin film 30. That is, the linear metal nanomaterial 14 is covered with the resin film 30 over the entire surface of the linear metal nanomaterial 14, is fused to the resin film 30, and is protected by the resin film 30. The linear metal nanomaterial 14 is the same as in the first embodiment.

The linear metal nanomaterial 14 is disposed to be embedded in the resin layer 32 in the resin film 30. The resin layer 32 includes a surface layer 32a and a linear metal nanomaterial layer 32b. The surface layer 32a is a layer that is disposed closer to the surface than the layer in which the linear metal nanomaterial 14 is embedded, and contains a resin. The linear metal nanomaterial layer 32b is a layer that is disposed on one surface of the surface layer 32a and contains a resin and the linear metal nanomaterial 14 disposed to be embedded in the resin. Since the surface layer 32a and the linear metal nanomaterial layer 32b have a common resin, there is no clear boundary.

Since the resin sheet 20 has the configuration as described above, similar to the resin sheet 10, the linear metal nanomaterial 14 is embedded in the resin film 30, and thus the contact area between the linear metal nanomaterial 14 and the resin film 30 is large. Therefore, heat can be sufficiently transferred to the material provided in contact with the resin sheet 20. In addition, the resin sheet 20 brings the other similar operational effects as those of the resin sheet 10.

Moreover, since the resin film 30 including the composite layer 34 including the reinforcing fibers 34a is used for the resin sheet 20, the strength and stability are improved.

Figure 13:
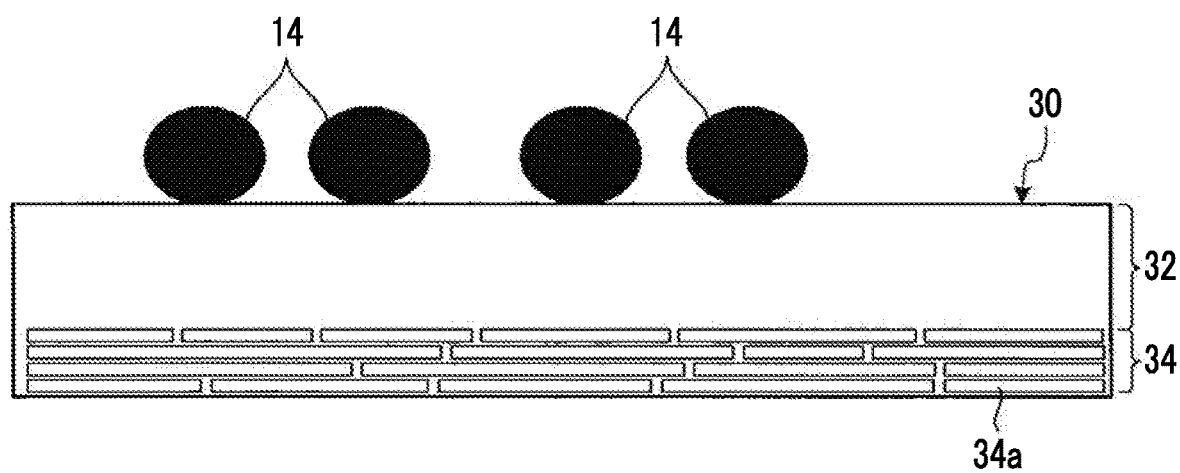
FIG. 13 is a schematic cross-sectional view illustrating one state in a method for manufacturing the resin sheet according to the second embodiment.

FIG. 13 is a schematic cross-sectional view illustrating one state in a method for manufacturing the resin sheet 20 according to the second embodiment. In addition, in FIG. 13, as in FIG. 12, the reinforcing fibers 34a are drawn in an extreme form for the description of the embodiment. However, in practice, the reinforcing fibers 34a are thinner than the illustrated size and are finely intertwined. The method for manufacturing the resin sheet 20 according to the second embodiment will be described using FIG. 13. As in the method for manufacturing the resin sheet 10, the method for manufacturing the resin sheet 20 includes the applying step (step S12), the heating step (step S14), and the pressurizing step (step S16).

Step S12 in the method for manufacturing the resin sheet 20 is different from step S12 in the method for manufacturing the resin sheet 10 that the object to which the linear metal nanomaterial 14 is applied is changed from the resin film 12 to the resin film 30. In step S12 in the method for manufacturing the resin sheet 20, the linear metal nanomaterial 14 is applied to the surface of the resin film 30 on the resin layer 32 side. Accordingly, as illustrated in FIG. 13, the resin film 30 having the linear metal nanomaterial 14 applied to the surface on the resin layer 32 side is obtained.

Step S14 and step S16 in the method for manufacturing the resin sheet 20 are different from step S14 and step S16 in the method for manufacturing the resin sheet 10 in that the target to be heated and pressurized is changed from the resin film 12 to the resin film 30. Since the linear metal nanomaterial 14 is pressed against the resin layer 32 of the softened resin film 30 by step S14 and step S16 in the method for manufacturing the resin sheet 20, the linear metal nanomaterial 14 is embedded inside the resin layer 32 of the resin film 30 by the van der Waals force acting between the linear metal nanomaterial 14 and the resin layer 32 of the resin film 30. Accordingly, the resin sheet 20 containing the linear metal nanomaterial 14 is obtained.

In addition, since the linear metal nanomaterial 14 cannot pass through the reinforcing fibers 34a, the linear metal nanomaterial 14 is not embedded inside the composite layer 34. Therefore, the linear metal nanomaterial 14 stays inside the resin layer 32 of the resin film 30 without reaching the inside of the composite layer 34 of the resin film 30.

Since the method for manufacturing the resin sheet 20 has the configuration as described above, as in the method for manufacturing the resin sheet 10, the linear metal nanomaterial 14 is embedded in the resin layer 32 of the resin film 30, and thus the contact area between the linear metal nanomaterial 14 and the resin layer 32 of the resin film 30 is large. Therefore, the resin sheet 20 capable of sufficiently transferring heat to the material provided in contact can be manufactured. Furthermore, the method for manufacturing the resin sheet 20 brings the other similar operational effects as those of the method for manufacturing the resin sheet 10.

Moreover, since the method for manufacturing the resin sheet 20 uses the resin film 30 including the composite layer 34 including the reinforcing fibers 34a, the resin sheet 20 having improved strength and stability can be manufactured.

Third Embodiment

Figure 14:
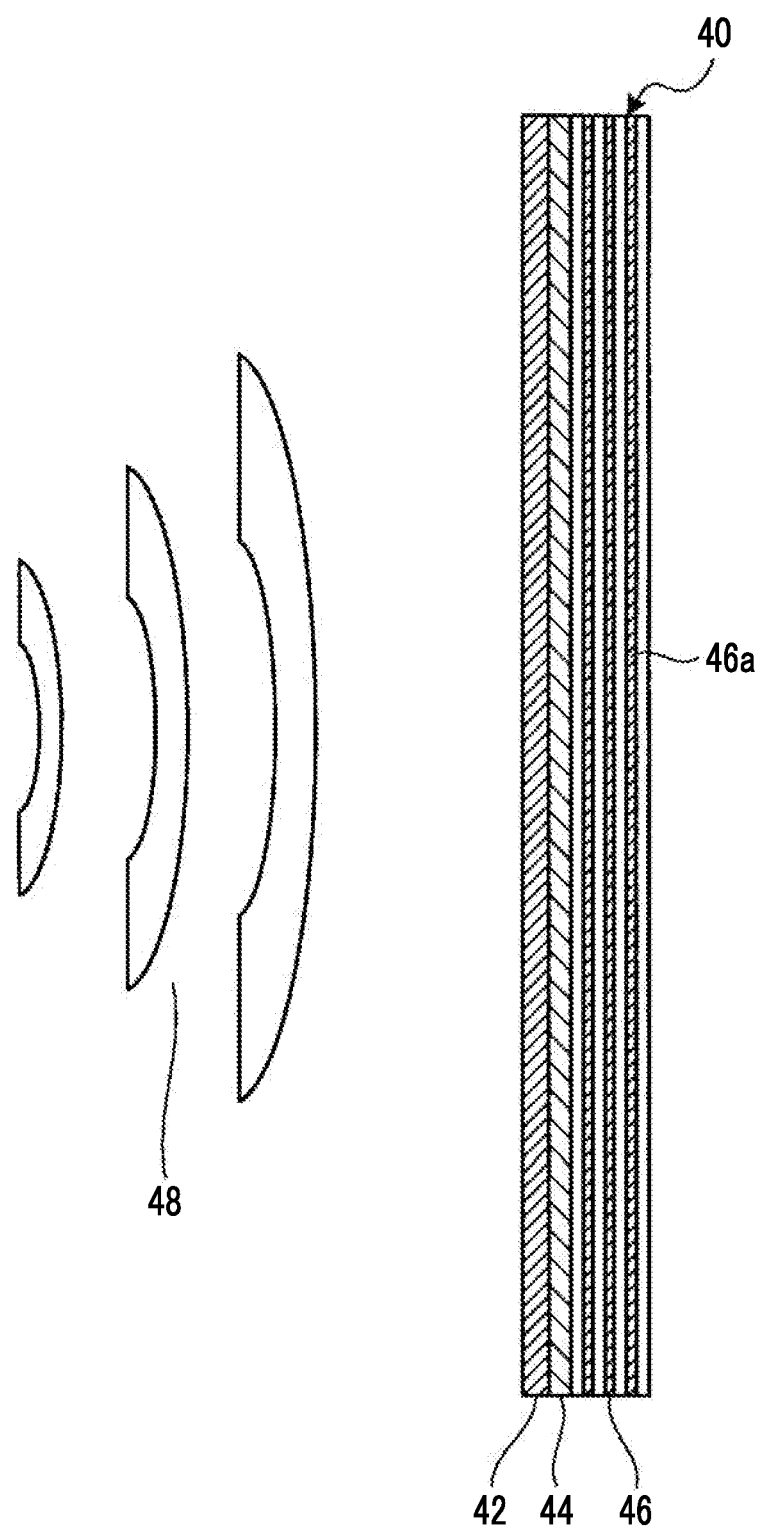
FIG. 14 is a schematic cross-sectional view of a structure according to a third embodiment.
Figure 15:
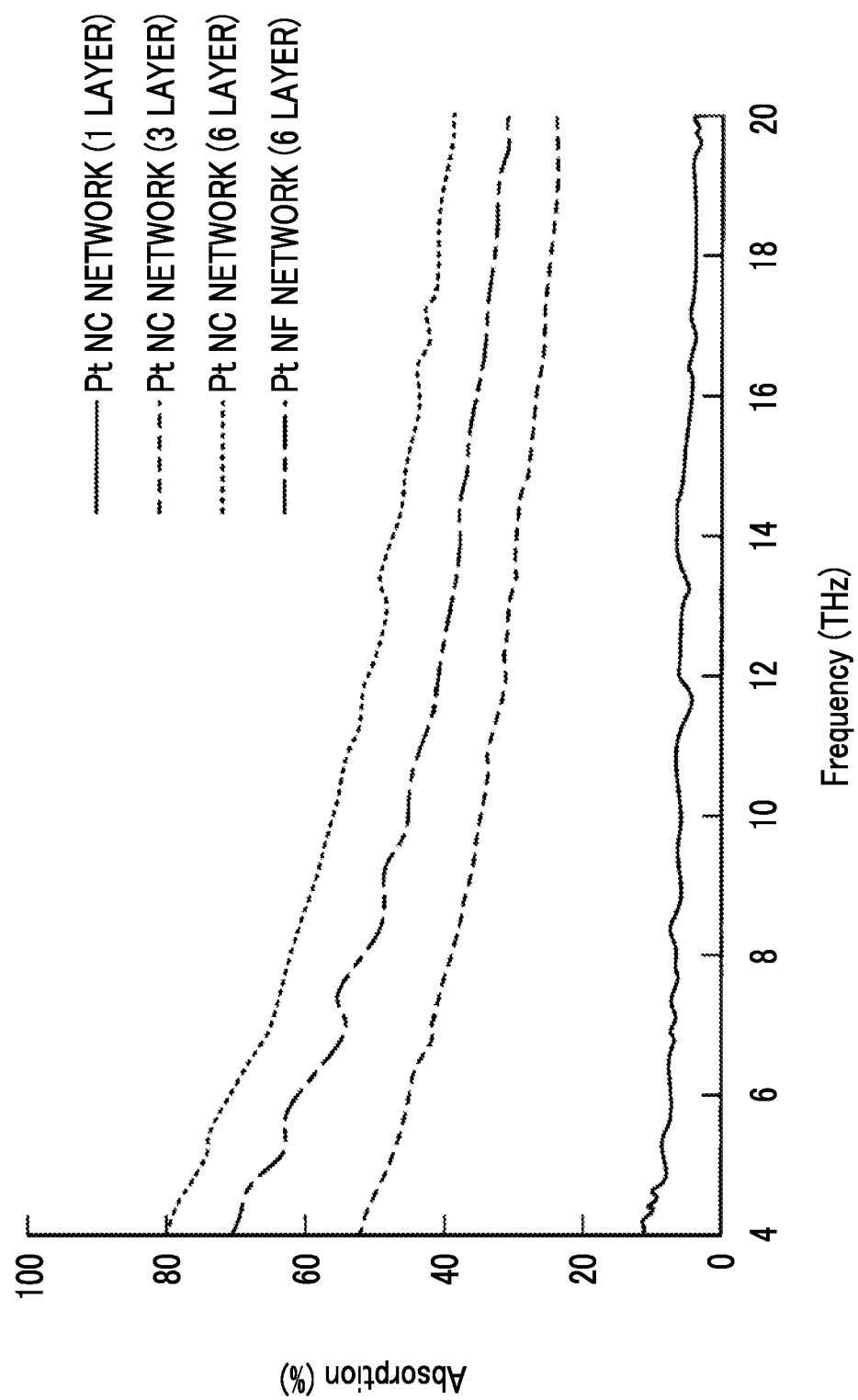
FIG. 15 is a graph of the electromagnetic wave absorption characteristics of the structure according to the third embodiment.
Figure 16:
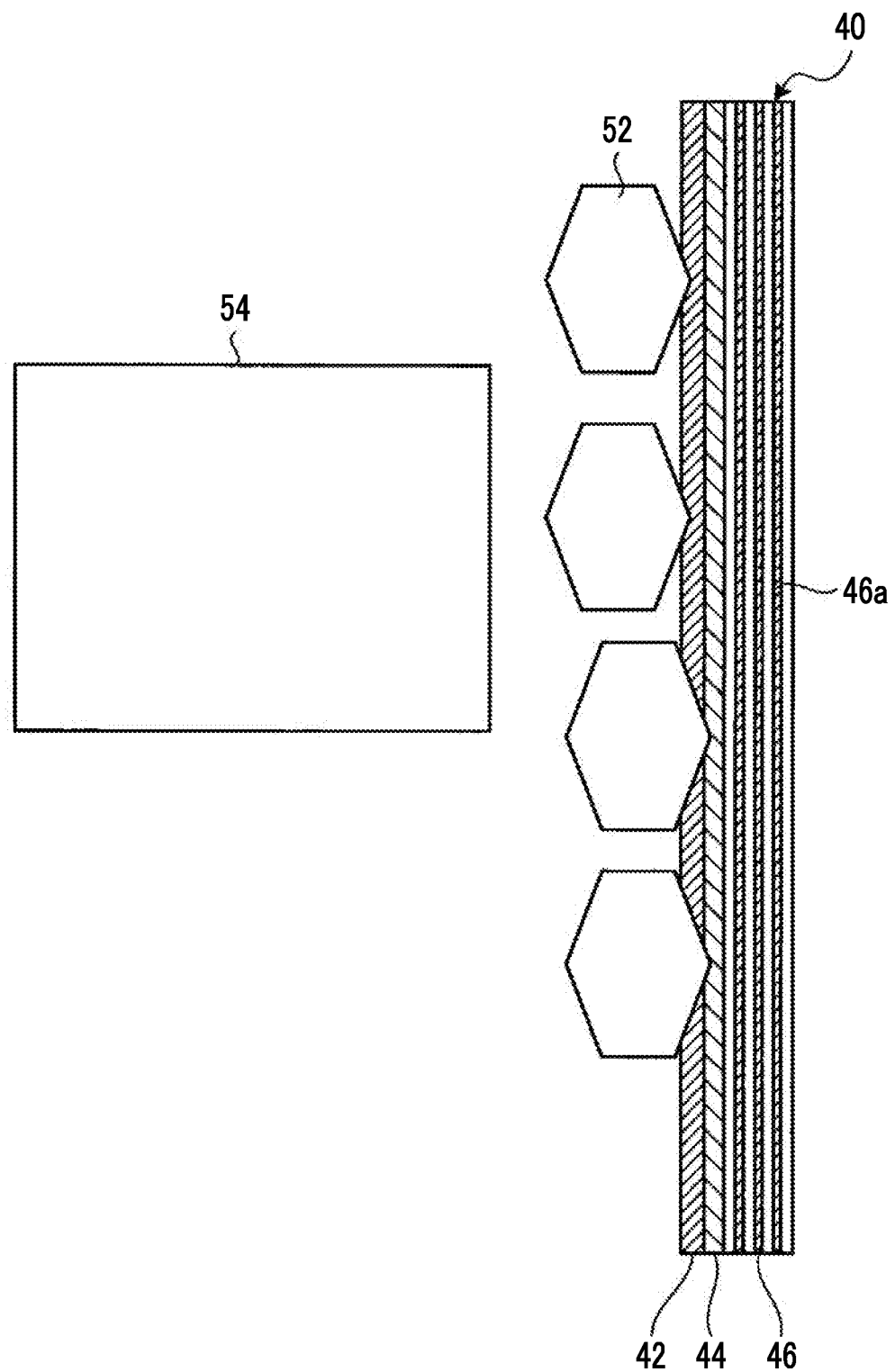
FIG. 16 is an explanatory view of a surface ice melting function of the structure according to the third embodiment.

FIG. 14 is a schematic cross-sectional view of a structure 40 according to a third embodiment. FIG. 15 is a graph of the electromagnetic wave absorption characteristics of the structure 40 according to the third embodiment. FIG. 16 is an explanatory view of a surface ice melting function of the structure 40 according to the third embodiment. In addition, in FIGS. 14 and 16, the linear metal nanomaterial 14 contained in the linear metal nanomaterial layer 44 is omitted. In addition, in FIGS. 14 and 16, reinforcing fibers 46a are drawn in an extreme form for the description of the embodiment. However, in practice, the reinforcing fibers 46a are thinner than the illustrated size and are finely intertwined. In the description of the third embodiment, like configurations similar to those of the first embodiment or the second embodiment are denoted by like reference numeral groups similar to those of the first embodiment or the second embodiment, and the detailed description thereof will not be repeated.

The structure 40 contains a composite material. As illustrated in FIG. 14, the structure 40 includes a surface layer 42, a linear metal nanomaterial layer 44, and a composite layer 46. The surface layer 42 is a layer that is disposed on the surface and contains a resin. The linear metal nanomaterial layer 44 is a layer that is disposed on one side of the surface layer 42 and contains a resin and the linear metal nanomaterial 14 disposed to be embedded in the resin. That is, the linear metal nanomaterial 14 is covered with the resin over the entire surface of the linear metal nanomaterial 14, is fused to the resin, and is protected by the resin. The linear metal nanomaterial layer 44 is protected by the surface layer 42. The linear metal nanomaterial 14 contained in the linear metal nanomaterial layer 44 is the same as that of the first embodiment, is suitably exemplified by the nanofibers coated with the metal thin film or the nanocoils in which the metal thin film is formed in a coil shape, and is preferably formed in a network shape. The composite layer 46 is a layer that is disposed on the side of the linear metal nanomaterial layer 44 opposite to the surface layer 42 and contains the resin and the reinforcing fibers 46a reinforcing the resin, and is formed of the composite material in which the resin is impregnated with the reinforcing fibers 46a. The reinforcing fibers 46a included in the composite layer 46 are the same as the reinforcing fibers 34a in the second embodiment.

The structure 40 and the composite material contained in the structure 40 are exemplified by materials used in aircraft, vehicles, ships, and the like. The resin contained in the surface layer 42, the linear metal nanomaterial layer 44, and the composite layer 46 in the structure 40 contains a thermoplastic resin, and preferably contains a thermosetting resin. The thermosetting resin is exemplified by an epoxy resin. The thermoplastic resin contained in each layer in the structure 40 is the same as the thermoplastic resin forming the resin film 12.

The thermosetting resin can be in a softened state, a cured state, and a semi-cured state. The softened state is a state before the thermosetting resin is thermally cured. The softened state is a state with no self-supporting property, and a state in which the shape cannot be held in a case of not being supported by a support. The softened state is a state in which the thermosetting resin can undergo a thermosetting reaction by being heated. The cured state is a state after the thermosetting resin is thermally cured. The cured state is a state having a self-supporting property and a state in which the shape can be held even in a case of not being supported by a support. The cured state is a state in which the thermosetting resin cannot undergo a thermosetting reaction even if the thermosetting resin is heated. The semi-cured state is a state between the softened state and the cured state. The semi-cured state is a state in which the thermosetting resin is thermally cured to a degree that is weaker than the cured state. The semi-cured state is a state having a self-supporting property and a state in which the shape can be held even in a case of not being supported by a support. The semi-cured state is a state in which the thermosetting resin can undergo a thermosetting reaction by being heated. In a case where the thermosetting resin is impregnated with the reinforcing fibers 46a in the composite layer 46, it is preferable that the structure 40 is a prepreg in which the thermosetting resin is in a semi-cured state, or the thermosetting resin is in a cured state.

The structure 40 includes the linear metal nanomaterial layer 44 containing the linear metal nanomaterial 14 that absorbs electromagnetic waves. Therefore, the structure 40 absorbs irradiated electromagnetic waves 48 depending on the characteristics of the linear metal nanomaterial 14 contained in the linear metal nanomaterial layer 44, and has a stealth function for electromagnetic wave detection.

The linear metal nanomaterial 14 contained in the structure 40 has absorption characteristics according to the frequency of the electromagnetic waves as shown in FIG. 15. FIG. 15 is a graph in which the horizontal axis is the frequency of electromagnetic waves (unit; THz (terahertz)) and the vertical axis is the absorbance (unit; % (percentage)). FIG. 15 shows absorption characteristics in a case of one layer of network-shaped nanocoil layer (PtNC network (one layer), solid line), absorption characteristics in a case of three layers of network-shaped nanocoil layers (PtNC network (three layers), dashed line), absorption characteristics in a case of six layers of network-shaped nanocoil layers (PtNC network (six layers), dotted line), and absorption characteristics in a case of six layers of network-shaped nanofiber layers (PtNF network (six layers), dot-dashed line). Here, Pt refers to platinum and indicates that the material of the metal thin film used for the nanocoils or the nanofibers is platinum. NC refers to NanoCoil (nanocoil) and NF refers to NanoFiber (nanofiber). In any of the above four cases, the linear metal nanomaterial 14 absorbs electromagnetic waves having a frequency in a range of at least 4 THz to 20 THz, as shown in FIG. 15. In any of the above four cases, as shown in FIG. 15, the linear metal nanomaterial 14 has a tendency that the lower the frequency, the higher the absorbance, and the higher the frequency, the lower the absorbance regarding frequencies within a range of 4 THz to 20 THz.

In the case of one layer of network-shaped nanocoil layer, the linear metal nanomaterial 14 absorbs electromagnetic waves having a frequency in the range of 4 THz to 20 THz with an absorbance in a range of 4% to 10%. In the case of three layers of network-shaped nanocoil layers, the linear metal nanomaterial 14 absorbs electromagnetic waves having a frequency in the range of 4 THz to 20 THz with an absorbance in a range of 25% to 55%. In the case of six layers of network-shaped nanocoil layers, the linear metal nanomaterial 14 absorbs electromagnetic waves having a frequency in the range of 4 THz to 20 THz with an absorbance in a range of 40% to 80%. In the case of six layers of network-shaped nanofiber layers, the linear metal nanomaterial 14 absorbs electromagnetic waves having a frequency in the range of 4 THz to 20 THz with an absorbance in a range of 30% to 70%. Accordingly, it can be seen that the linear metal nanomaterial 14 preferably has a larger number of layers of the network-shaped nanocoil layers within the range of one layer to six layers, and the absorbance of electromagnetic waves having a frequency in the range of 4 THz to 20 THz can be improved. In addition, it can be seen that in the case where the number of layers of the mesh-shaped layers is six, the linear metal nanomaterial 14 preferably uses the nanocoil layers rather than the nanofiber layers, and the absorbance of electromagnetic waves having a frequency in the range of 4 THz to 20 THz is improved.

The structure 40 includes the linear metal nanomaterial layer 44 containing the linear metal nanomaterial 14 that generates heat when an electric field is applied. Therefore, according to the characteristics of the linear metal nanomaterial 14 contained in the linear metal nanomaterial layer 44, the structure 40 has a surface ice melting function of melting ice 52 adhered to the surface of the structure 40 by generating heat when an electric field is applied.

Specifically, as illustrated in FIG. 16, in a case where the ice 52 adheres to the surface on the surface layer 42 side, by causing an electric field applying electrode 54 to approach the surface layer 42 side of the structure 40 in a non-contact state and applying an electric field to the linear metal nanomaterial layer 44 containing the linear metal nanomaterial 14, the linear metal nanomaterial 14 generates heat, whereby the structure 40 can melt the ice 52 and remove the ice 52 from the surface layer 42.

Since the structure 40 has the configuration as described above, the structure 40 includes the linear metal nanomaterial layer 44 in which the linear metal nanomaterial 14 is embedded in the resin, so that the structure 40 can have various functions based on the function of absorbing electromagnetic waves.

In the structure 40, it is preferable that the linear metal nanomaterial 14 is the nanofibers coated with the metal thin film or the nanocoils in which the metal thin film is formed in a coil shape. In this case, in the structure 40, the linear metal nanomaterial 14 contained in the linear metal nanomaterial layer 44 can suitably absorb electromagnetic waves.

In the structure 40, it is preferable that the linear metal nanomaterial 14 is formed in a network shape. In this case, since the linear metal nanomaterial 14 is uniformly distributed throughout, the structure 40 can have various functions based on the function of absorbing electromagnetic waves uniformly throughout.

In the structure 40, it is preferable that the linear metal nanomaterial 14 absorbs electromagnetic waves and has a stealth function for electromagnetic wave detection. In this case, the structure 40 can stably have the stealth function for electromagnetic wave detection by the linear metal nanomaterial 14 protected by the resin.

It is preferable that in the structure 40, the linear metal nanomaterial 14 has the surface ice melting function of melting the ice 52 adhered to the surface by generating heat when an electric field is applied. In this case, the structure 40 can stably have the surface ice melting function of melting the ice 52 adhered to the surface by the linear metal nanomaterial 14 protected by the resin.

Figure 17:
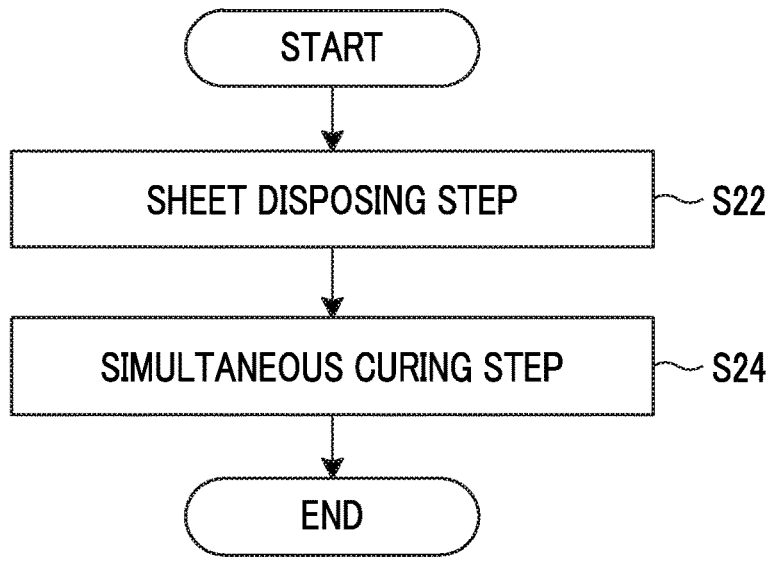
FIG. 17 is a flowchart showing a method for manufacturing the structure according to the third embodiment.
Figure 18:
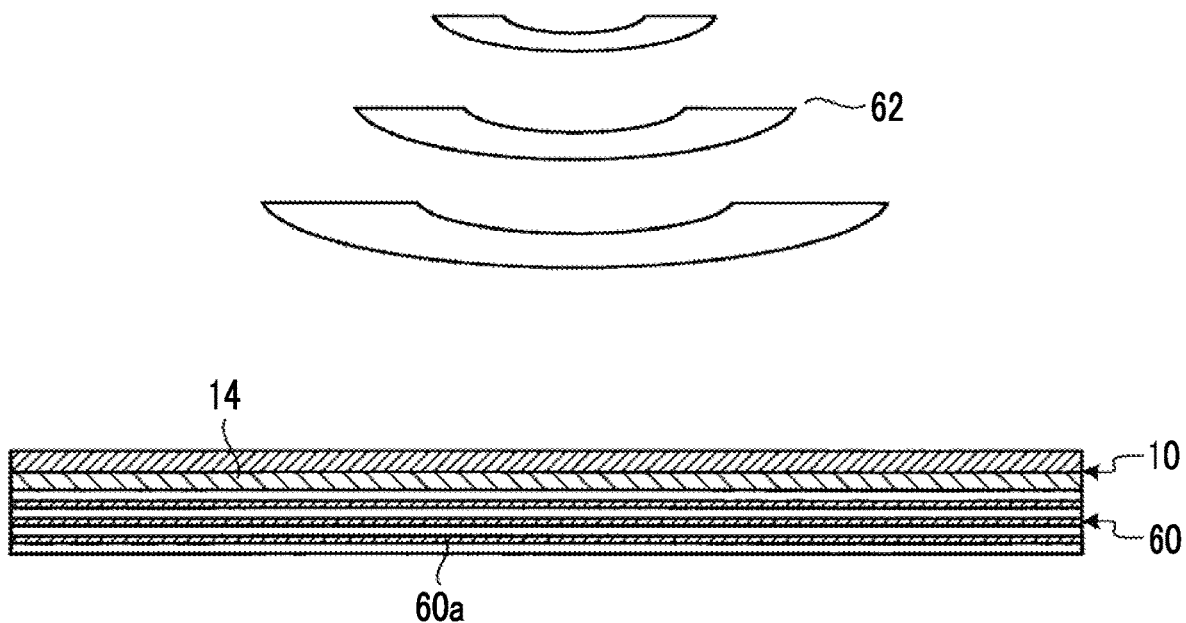
FIG. 18 is a schematic cross-sectional view illustrating one state in the method for manufacturing the structure according to the third embodiment.
Figure 19:
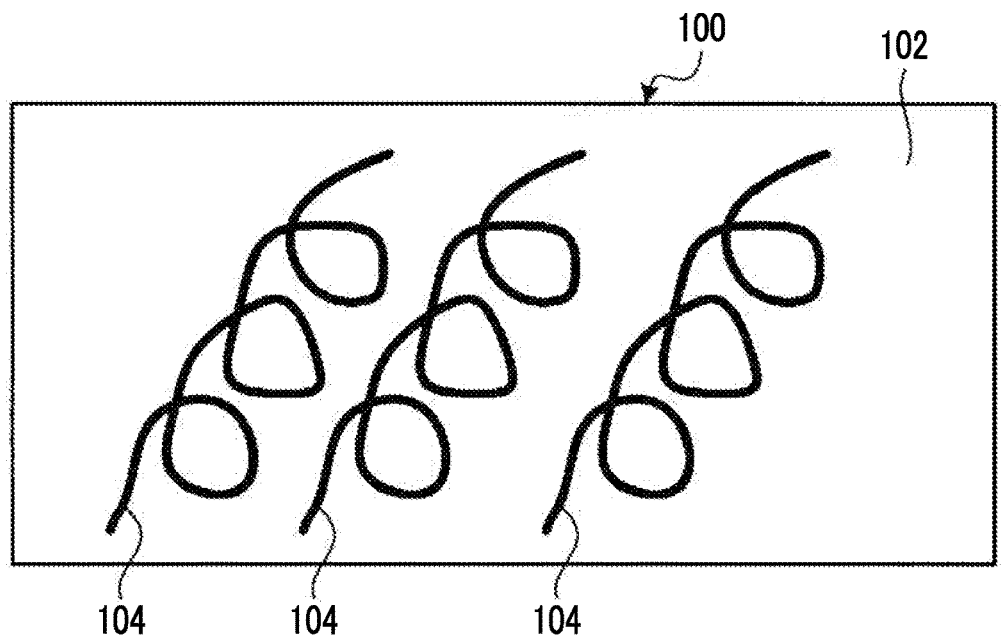
FIG. 19 is a schematic plan view of a resin sheet in the related art.
Figure 20:
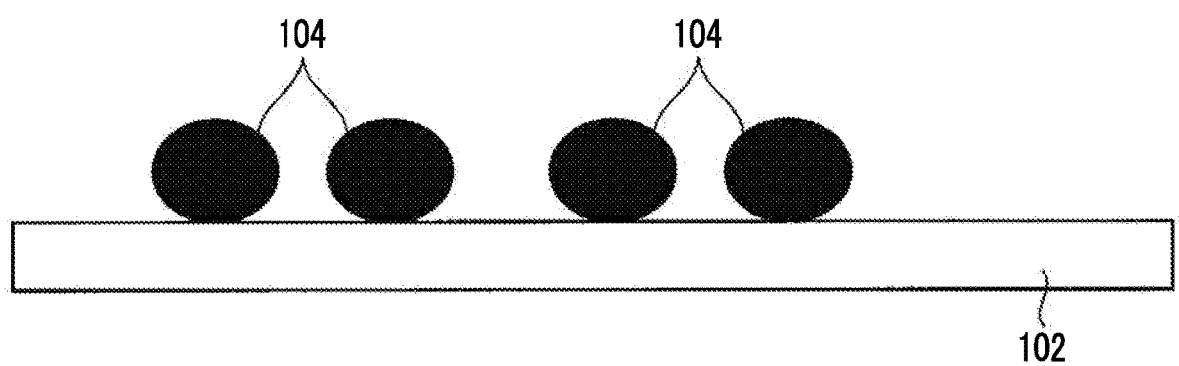
FIG. 20 is a schematic cross-sectional view of the resin sheet in the related art.

FIG. 17 is a flowchart showing the method for manufacturing the structure 40 according to the third embodiment. FIG. 18 is a schematic cross-sectional view illustrating one state in the method for manufacturing the structure 40 according to the third embodiment. In addition, in FIG. 18, the linear metal nanomaterial 14 contained in the resin sheet 10 is shown in a simplified form. Furthermore, in FIG. 18, reinforcing fibers 60*a* are drawn in an extreme form for the description of the embodiment. However, in practice, the reinforcing fibers 60*a* are thinner than the illustrated size and are finely intertwined. The method for manufacturing the structure 40 according to the third embodiment will be described using FIGS. 17 and 18. As shown in FIG. 17, the method for manufacturing the structure 40 includes a sheet disposing step (step S22) and a simultaneous curing step (step S24).

In the method for manufacturing the structure 40, as illustrated in FIG. 18, the resin sheet 10 according to the first embodiment and a composite material 60 are used. In the method for manufacturing the structure 40, the resin sheet 20 according to the second embodiment may be used instead of the resin sheet 10 according to the first embodiment. The composite material 60 is a composite material in which a resin containing a thermosetting resin is impregnated with the reinforcing fibers 60*a*.

In the method for manufacturing the structure 40, it is preferable to use the resin sheet 10 containing a resin having a high affinity for the resin contained in the composite material 60. For example, in the method for manufacturing the structure 40, in a case where the resin contained in the composite material 60 is a thermoplastic resin, it is preferable to use the resin sheet 10 containing the same thermoplastic resin. In the method for manufacturing the structure 40, in a case where the resin contained in the composite material 60 is an epoxy resin of a thermosetting resin, it is preferable to use the resin sheet 10 containing polyetherimide (PEI), which is a thermoplastic resin having a high affinity for the epoxy resin.

First, the resin sheet 10 according to the first embodiment is disposed on one surface of the composite material 60 (step S22). After step S22, as shown in FIG. 18, an electric field 62 is applied to the resin sheet 10. The application of the electric field 62 is performed, for example, by causing the electric field applying electrode 54 to approach the resin sheet 10 side in a non-contact state. The application of the electric field 62 to the resin sheet 10 causes the linear metal nanomaterial 14 contained in the resin sheet 10 to absorb the electric field 62 and generate heat. As the linear metal nanomaterial 14 generates heat, the thermoplastic resin contained in the resin sheet 10 and the resin containing the thermosetting resin contained in the composite material 60 are mixed and simultaneously cured (co-cured) (Step S24). Accordingly, the structure 40 is obtained.

By step S24, a region of the resin sheet 10 that does not include the linear metal nanomaterial 14 becomes the surface layer 42. By step S24, a region of the resin sheet 10 that includes the linear metal nanomaterial 14 becomes the linear metal nanomaterial layer 44. By step S24, the reinforcing fibers 60*a* become the reinforcing fibers 46*a*, and the region of the composite material 60 becomes the composite layer 46.

In the method for manufacturing the structure 40, in a case where the resin sheet 20 according to the second embodiment is used instead of the resin sheet 10 according to the first embodiment, a region of the resin sheet 20 corresponding to the surface layer 32*a* becomes the surface layer 42 by step S24. By step S24, a region of the resin sheet 20 corresponding to the linear metal nanomaterial layer 32*b* becomes the linear metal nanomaterial layer 44. By step S24, the reinforcing fibers 34*a* in the resin sheet 20 and the reinforcing fibers 60*a* in the composite material 60 are combined to become the reinforcing fibers 46*a*. By step S24, the composite layer 34 and the composite material 60 in the resin sheet 20 are combined to become the composite layer 46.

Since the method for manufacturing the structure 40 has the configuration as described above, the resin sheet 10 in which the linear metal nanomaterial 14 is embedded in the resin film 12 or the resin sheet 20 in which the linear metal nanomaterial 14 is embedded in the resin film 30 is used, and thus the contact area between the linear metal nanomaterial 14 and the resin is large. Therefore, heat can be sufficiently transferred and the composite material 60 and the resin sheet 10 or the resin sheet 20 can be simultaneously cured.

In the method for manufacturing the structure 40, it is preferable that the linear metal nanomaterial 14 absorbs electromagnetic waves and has the stealth function for electromagnetic wave detection. In this case, the stealth function for electromagnetic wave detection can be stably added by the linear metal nanomaterial 14 protected by the resin.

In the method for manufacturing the structure 40, it is preferable that the linear metal nanomaterial 14 has the surface ice melting function of melting the ice 52 adhered to the surface by generating heat when an electric field is applied. According to this configuration, the surface ice melting function of melting the ice 52 adhered to the surface can be stably added by the linear metal nanomaterial 14 protected by the resin.

Fourth Embodiment

The airframe of an aircraft according to a fourth embodiment uses the structure 40 according to the third embodiment. In the description of the fourth embodiment, like configurations similar to those of the first to third embodiments are denoted by like reference numeral groups similar to those of the first to third embodiments, and the detailed description thereof will not be repeated.

Since the airframe of the aircraft according to the fourth embodiment uses the structure 40 according to the third embodiment, various functions based on the function of absorbing electromagnetic waves provided in the structure 40, for example, the stealth function or the surface ice melting function can be provided. The details thereof are described below.

In the airframe of an aircraft in the related art, the surface is coated with an electromagnetic wave absorbing material paint to reduce the radar cross-section (RCS) and have a stealth function. In the airframe of the aircraft in the related art, since the electromagnetic wave absorbing material paint on the surface peels off with each flight, in order to maintain the stealth function, the electromagnetic wave absorbing material paint needs to be applied to the surface with each flight. Therefore, the airframe of the aircraft in the related art needs a maintenance cost for maintaining the stealth function.

Since the airframe of the aircraft according to the fourth embodiment uses the structure 40, the linear metal nanomaterial 14 that absorbs electromagnetic waves is contained in the linear metal nanomaterial layer 44. The linear metal nanomaterial 14 can absorb electromagnetic waves having frequencies including the frequency of the electromagnetic wave emitted by a radar detector, such as a frequency in the range of 4 THz to 20 THz. Therefore, the airframe of the aircraft according to the fourth embodiment has a low RCS and a stealth function due to the linear metal nanomaterial 14.

The linear metal nanomaterial 14 contained in the airframe of the aircraft according to the fourth embodiment is protected by the resin contained in the surface layer 42 and the linear metal nanomaterial layer 44 containing the resin, and therefore does not peel off with each flight. Therefore, the airframe of an aircraft according to the fourth embodiment including the protected linear metal nanomaterial 14 can maintain the stealth performance without any particular maintenance. Accordingly, compared to the airframe of an aircraft in the related art, the maintenance cost for maintaining the stealth function can be reduced.

In the airframe of an aircraft, a part of the main wing of the aircraft in the atmosphere reaches a low temperature particularly in winter, and there is a possibility that icing may occur at the tip end region of the part of the main wing. The icing at the tip end region of the part of the main wing degrades the aerodynamic characteristics, so that the icing needs to be removed at the time of takeoff.

In the airframe of the aircraft in the related art, in a case where the airframe of the aircraft is made of metal, icing is melted and removed by applying a snow melting agent to the icing or by applying warm water to the icing. In the airframe of the aircraft in the related art, in a case where the airframe of the aircraft is made of a composite material, since the resin contained in the composite material and a snow melting agent react chemically, the icing is melted and removed by applying hot water to the icing. The method of melting and removing icing by applying hot water to icing takes time. Therefore, the airframe of the aircraft in the related art particularly formed of the composite material takes time to remove icing, and thus needs operation costs.

Since the airframe of the aircraft according to the fourth embodiment uses the structure 40, the linear metal nanomaterial 14 that absorbs electromagnetic waves is contained in the linear metal nanomaterial layer 44. The linear metal nanomaterial 14 can generate heat when an electric field is applied. Therefore, in the airframe of the aircraft according to the fourth embodiment, the linear metal nanomaterial 14 has the surface ice melting function of generating heat by absorbing an electric field applied by the electric field applying electrode 54 or the like and melting and removing icing with the heat.

The linear metal nanomaterial 14 contained in the airframe of the aircraft according to the fourth embodiment is protected by the resin contained in the surface layer 42 and the linear metal nanomaterial layer 44 containing the resin, and therefore does not peel off with each flight. Therefore, the airframe of the aircraft according to the fourth embodiment including the protected linear metal nanomaterial 14 can melt and remove icing with heat easily, stably, and within a short period of time by causing the electric field applying electrode 54 or the like to approach the airframe of the aircraft without damage to the airframe of the aircraft. Therefore, the airframe of the aircraft according to the fourth embodiment can reduce the time taken to remove icing, particularly compared to the airframe of the aircraft in the related art formed of a composite material, thereby reducing operation costs.

The object in which the structure 40 according to the third embodiment is used is not limited to the airframe of the aircraft as in the fourth embodiment, but may be used in vehicles, ships, and the like.

REFERENCE SIGNS LIST

10, 20 resin sheet
12, 30 resin film
14 linear metal nanomaterial
16 pressurizing sheet
18 weight
32 resin layer
32a, 42 surface layer
32b, 44 linear metal nanomaterial layer
34, 46 composite layer
34a, 46a, 60a reinforcing fiber
40 structure
48 electromagnetic wave
52 ice
54 electric field applying electrode
60 composite material
62 electric field
100 resin sheet in the related art
102 resin film in the related art
104 linear metal nanomaterial in the related art

The invention claimed is:

1. A resin sheet comprising:
a resin film having thermoplasticity; and
a linear metal nanomaterial embedded in the resin film, the linear metal nanomaterial being covered with the resin film over an entire surface of the linear metal nanomaterial and fused to the resin film so as to be protected by the resin film, wherein the linear metal nanomaterial is uniformly distributed over an entire surface of the resin film where the linear metal nanomaterial is formed.

2. The resin sheet according to claim 1,
wherein the linear metal nanomaterial is a nanofiber coated with a metal thin film.

3. The resin sheet according to claim 1,
wherein the linear metal nanomaterial is a nanocoil in which a metal thin film is formed in a coil shape.

4. The resin sheet according to claim 1,
wherein the linear metal nanomaterial is formed in a network shape.

5. The resin sheet according to claim 1,
wherein the resin film includes:
- a reinforcing fiber that reinforces the resin film;
- a resin layer without the reinforcing fiber; and
- a composite layer containing the reinforcing fiber, and the linear metal nanomaterial is disposed to be embedded in the resin layer.

* * * * *